UNITED STATES PATENT OFFICE 2,405,672

REMOVAL OF HYDROGEN SULPHIDE FROM GAS STREAMS

Ronald E. Reitmeier, Louisville, Ky., assignor to The Girdler Corporation, Louisville, Ky., a corporation of Delaware No Drawing. Application March 7, 1945, Serial No. 581,547

26 Claims. (Cl. 23—2)

This invention relates to the purification of gaseous mixtures and more particularly to the removal of hydrogen sulphide from gaseous mixtures containing the same, and involves as an essential feature the use of soluble dichromates.

Although suitable for removal of hydrogen sulphide from any gaseous mixture containing the same, the process of my present invention is particularly suited for the purification of carbon dioxide which is to be used for the manufacture of dry ice. It is important that carbon dioxide, when used for that purpose, be substantially free from contaminating materials, especially hydrogen sulphide.

It has been proposed in Hackhofer et al. Patent 2,044,116, to use alkali metal monochromate solutions for the absorption of carbonic acid from gases containing it and impurities such as oxygen, nitrogen and rare gases. The absorption is at superatmospheric pressures and the subsequent recovery of carbonic acid is effected by the reduction of pressure, the impurities remaining behind in the solution. In this patent it is specified, however, that such impurities as hydrogen sulphide should be removed before introducing the gas mixture into the chromate solution (p. 1, col. 2, lines 28–33). Thus the process is not suitable for the separation of hydrogen sulphide and carbon dioxide.

Reich, in Patents 1,519,932, 2,122,586, and 2,225,131, uses hexavalent chromium compounds such as sodium chromate and sodium dichromate for the oxidation of impurities in the purification of carbon dioxide, and states (Patent 2,225,131, p. 1, col. 1, lines 53–55) that the sodium chromate solutions are over 50 times as effective as dichromate solutions. He further specified that the chromium compound should be maintained in chromate form by the continuous addition of alkali compounds in the same proportion as the chromate is converted to the dichromate. Thus the presence of dichromates is indicated as disadvantageous.

I have discovered, in contrast to the prior art above referred to, that soluble dichromates, such as sodium, potassium and ammonium dichromates, are more effective than chromates as oxidizing and purifying agents when the dichromates are used under proper conditions. I have found, for example, that hydrogen sulphide is very effectively removed from a gaseous mixture when the gaseous mixture is scrubbed with an aqueous solution of the dichromate containing a metal salt capable of retaining a relatively large concentration of the sulphide in such solutions in contact with the dichromate, provided the solution is maintained within the proper acid pH range.

The dichromates are recognized as better oxidizing agents than the chromates. However, in order to have the dichromate present to the greatest degree, it is necessary to maintain the solution well within the acid pH range, since the greater the pH, the greater will be the tendency of the chromate to exist in the form of the monochromate. Maintaining low pH increases the tendency of the chromate to exist in the dichromate form, but normally the more acid the solution the less will be the concentration of hydrogen sulphide in the solution. In other words, maximum concentration of the oxidizing dichromate may be attained by maintaining the solution in the acid pH range, but this tends to decrease the concentration of hydrogen sulphide in the solution so that the dichromate has very little hydrogen sulphide to work on. I maintain the solution in the acid pH range so as to insure the presence of a considerable quantity of dichromate, so as to secure the benefit of its superior oxidizing action, and as an important feature of my invention I add a metal compound capable of counteracting the tendency toward elimination of hydrogen sulphide from an acid solution, and capable of retaining an increased concentration of sulphide in the solution in contact with the dichromate.

While sodium, potassium and ammonium dichromates are referred to above as being suitable for the practice of the process of the present invention, the sodium dichromate is preferred. Any concentration of the dichromate may be employed, but from an economic standpoint it is preferable to use a solution containing in the neighborhood of 2% sodium dichromate.

The metal salt which is added to the dichromate solution must be a salt of a metal the carbonates and chromates of which are soluble under the conditions required for carrying out my process as set forth more in detail hereinafter. Metal salts of zinc, copper, cadmium, mercury, arsenic, tungsten, tin and vanadium may be employed. Although salts of all of those metals are effective for the purposes of the present invention, the salts of zinc, copper, cadmium and mercury, in the order given, are the most effective. It has been found that the anion of the metal salt is not particularly important, but the sulphates or the chlorides are preferable.

The metal salt added to the dichromate solution may be in any concentration up to the point of saturation, but it has been found that a dichromate solution containing 2 to 3% $ZnSO_4 \cdot 7H_2O$ is most effective and economical in removing hydrogen sulphide.

As above noted, the addition of such metal salts to the dichromate solution under proper conditions serves to increase the retention of sulphur in the solution in the form of a sulphide, so that a greater concentration thereof may be readily acted upon by the dichromate, but I have found that under some conditions the benefit of the added metal salt may be counteracted at least to some degree if the dichromate solution is too acid. Consequently, in some cases it may be necessary to add to the solution a further ingredient to serve as a buffer to maintain the solution within the proper acid pH range during the entire period of the process. The particular pH range will vary within the acid range, depending upon the particular metal salt that is added to the dichromate solution, and with some particular metal salts the range may be very narrow. On the other hand, when certain metal salts are added to the dichromate solution the desired pH may be attained and maintained without the specific addition of a buffer, due to reactions occurring in the practice of the process. Therefore it is a feature of the present invention, and within the scope thereof, that the solution be maintained within the required pH range, with or without the addition of a buffer, depending upon the particular metal salt employed. In other words, in the carrying out of the present invention it is particularly important that the solution of dichromate and added metal salt be maintained within the proper pH range, and a buffer may be added when necessary to maintain such pH range.

In order that the reasons for, and the manner of, maintaining a particular pH range may be more clearly understood, I will briefly set forth an example of the reactions which I believe take place in the course of my present process. If the added metal salt be a sulphate, the first reaction is:

1. $MeSO_4 + H_2S = MeS + H_2SO_4$

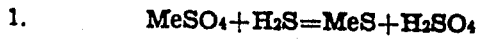

(where Me represents one of the metals previously mentioned). Under proper conditions the metal sulphide which is produced will precipitate and be available, along with hydrogen sulphide, for oxidation by the dichromate in the solution. However, the above reaction is a reversible one, and if the acidity of the solution becomes too great, the MeS will go back into solution to reform $MeSO_4$ and $H_2S$, so that only a relatively small amount of sulphide will be available for oxidation by the dichromate. Therefore it is important that the acidity of the solution be maintained sufficiently low to insure that precipitation of the metal sulphide does take place, thereby to increase the concentration of sulphide made available in the solution for oxidation by the dichromate. As the sulphides of copper, mercury, cadmium and zinc have different degrees of solubility, practical operation of my process makes it necessary to select a pH for the solution in accordance with the solubility of the sulphide of the metal of the particular salt used.

The first reaction above referred to is a very rapid one, and is followed by a second reaction involving the dichromate and resulting in the formation of free sulphur. Whether this is a single reaction or a series of reactions is not definitely known, but this is immaterial so far as the present process is concerned. The net effect may be represented by the following reaction:

2. $3MeS + Na_2Cr_2O_7 + 3H_2SO_4 + H_2O = 3S + 3MeSO_4 + 2Cr(OH)_3 + 2NaOH$

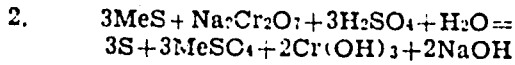

It will be noted that $MeSO_4$ is used up in first reaction and acid is produced, and that $MeSO_4$ is produced and acid is used in the second reaction, but that the second reaction also produces NaOH which will neutralize the acid and the overall result is to make the solution more basic.

Since reaction 1 is much more rapid than reaction 2, if no buffer were added the absorption of only a small amount of $H_2S$ into the solution would reduce the pH to such a value, due to reaction 1, that no further MeS would be formed. Under such conditions the oxidation reaction would not take place to any great extent, and there would then take place only the oxidation of such small quantities of $H_2S$ as might be retained in the solution. I have found, for example, that the solubility of HgS in solutions whose pH is less than 1, is great enough that reaction 2 will take place with sufficient rapidity to insure complete removal of $H_2S$ from a gas stream as fast as the $H_2S$ is introduced into the scrubbing solution. The solubility of CdS in solutions whose pH is less than 2 is great enough that reaction 2 will take place with sufficient rapidity to insure complete removal of $H_2S$ from a gas stream as fast as the $H_2S$ is introduced into the scrubbing solution. In the case of Cu, the lower pH limit is 1, and in the case of Zn the lower pH limit is 4.

For the reasons above pointed out it is important that when mercury and copper salts are added to the dichromate solution the pH range will be maintained between about 1 and about When using the mercury salt the desired range is maintained without the addition of a buffer. When cadmium salts are added the solution should be maintained within a pH range from about 2 to about 7, and it is usually found necessary to add a buffer to maintain that range. When zinc salts are used, the pH range should be maintained between about 4 and about 7, the preferred pH range being between 4.5 and 6.5, and it being necessary usually to add a buffer to maintain the desired range. As will be understood by one skilled in the art, the necessity for adding a buffer, and the amount of such buffer added when necessary, will depend somewhat on the concentration of the dichromate and added metal salt in the solution.

Where it is found necessary to buffer the solution, the buffer may be comprised of any suitable material capable of maintaining the solution within the desired pH range, depending upon the particular added salt employed as above discussed, but buffers which cause precipitation of the metal salt, or which are oxidized by the dichromate are to be avoided. The type of material suitable as buffers is well known in the art and stated in the literature. Borax has been found to provide a satisfactory buffering action. The concentration of the buffer will of course depend upon how much buffering action is required to maintain the solution within the proper pH range, depending upon the particular metal salt that is added to the dichromate solution, and also upon the concentrations of the dichromate and added metal salt in the solution. When employing solutions containing 2% $Na_2Cr_2O_7 \cdot 2H_2O$ and 2 to 3% $ZnSO_4 \cdot 7H_2O$, it has been found that a borax concentration of about 0.5 to 1.5% is satisfactory.

A solution which is particularly effective in removing hydrogen sulphide from gaseous mixtures containing the same, contains 2% $Na_2Cr_2O_7 \cdot 2H_2O$, 2% to 3% $ZnSO_4 \cdot 7H_2O$, and 0.5% to 1.5% $Na_2B_4O_7 \cdot 10H_2O$.

In the carrying out of the present invention the gas stream from which the hydrogen sulphide is to be removed may be scrubbed with a solution of the kind hereinbefore described, at any desired pressure. Also, such solutions may be used at any temperature between the freezing point and the boiling point of the solution, but it is desirable that it be used at the temperature at which the gas to be scrubbed is available.

Any well known equipment commonly used for effecting contact between a gas stream and an absorption medium may be employed for carrying out the present invention. For example, the gas stream may be passed countercurrently through the absorption solution in a tower packed with quartz or Raschig rings in a well known manner. It is not intended, however, that the invention be limited to any particular equipment for carrying out the process since, as indicated above, any suitable equipment may be employed.

In practice two towers may be used and the gases passed therethrough in series, and separate portions of the solutions circulated through each, so that the main absorption is in the first, and the second acts on the small residual hydrogen sulfide. When the solution of the first tower becomes spent, it may be replaced by a fresh solution, and the gas flow may be through the towers in the reverse sequence.

Having thus described my invention what I claim as new and desire to secure by Letters Patent is:

1. A process for the removal of hydrogen sulphide from gaseous mixtures containing the same, which comprises scrubbing such gaseous mixtures with an aqueous solution of a dichromate and a salt of a metal selected from the group comprising zinc, copper, cadmium, mercury, arsenic, tungsten, tin and vanadium, and in which said solution is maintained of such acidity that considerable quantities of sulphide are maintained in the solution for action thereon by the dichromate.

2. A process for the removal of hydrogen sulphide from gaseous mixtures containing the same, which comprises scrubbing such gaseous mixtures with an aqueous solution of an alkali metal dichromate and a salt of a metal selected from the group comprising zinc, copper, cadmium, mercury, arsenic, tungsten, tin and vanadium, and in which said solution is maintained of such acidity as will permit substantial precipitation of the sulphides of said last mentioned metals and prevent substantial formation of monochromates.

3. A process for the removal of hydrogen sulphide from gaseous mixtures containing the same, which comprises scrubbing such gaseous mixtures with an aqueous solution of dichromate and a zinc salt, and which said solution is maintained of such acidity as will insure retention of sulphide in the solution.

4. A process for the removal of hydrogen sulphide from gaseous mixtures containing the same, which comprises scrubbing such gaseous mixtures with an aqueous solution of a dichromate and a zinc salt, and which said solution is maintained within the pH range of 4 to 7.

5. A process for the removal of hydrogen s[ul]phide from gaseous mixtures containing same, which comprises scrubbing such gase[ous] mixtures with an aqueous solution of a dich[ro]mate and a zinc salt, together with a buffer wh[ich] acts to maintain the solution within an acidic range which will permit substantial precipitat[ion] of zinc sulphide.

6. A process for the removal of hydrogen s[ul]phide from gaseous mixtures containing the sa[me] which comprises scrubbing such gaseous mixtu[res] with an aqeous solution of sodium dichromat[e] zinc salt, and a buffer, which latter acts to ma[in]tain said solution within an acidic pH range wh[ich] will permit substantial precipitation of zinc s[ul]phide.

7. A process for the removal of hydrogen s[ul]phide from gaseous mixtures containing the sa[me] which comprises scrubbing such gaseous mixtu[re] with an aqueous solution of sodium dichroma[te] zinc sulphate and a buffer, which latter ma[in]tains an acidic pH range which will permit s[ub]stantial precipitation of zinc sulphide and will p[re]vent formation of substantial amounts of mo[no]chromate.

8. A process for the removal of hydrogen s[ul]phide from gaseous mixtures containing the sa[me] which comprises scrubbing such gaseous mixtu[re] with an aqueous solution of a dichromate co[n]taining a zinc salt, and which said solution [is] maintained within the pH range of 4 to 7 by [the] action of a buffer.

9. A process for the removal of hydrogen s[ul]phide from gaseous mixtures containing the sa[me] which comprises scrubbing such gaseous mixtu[re] with an aqueous solution of dichromate and copper salt, and which said solution is maintai[ned] of such acidity as will insure retention of sulph[ide] in the solution.

10. A process for the removal of hydrogen s[ul]phide from gaseous mixtures containing the sa[me] which comprises scrubbing such gaseous mixtu[re] with an aqueous solution of a dichromate and copper salt, and which said solution is maintai[ned] within the pH range of 1 to 7.

11. A process for the removal of hydrogen s[ul]phide from gaseous mixtures containing the sa[me] which comprises scrubbing such gaseous m[ix]tures with an aqueous solution of a dichrom[ate] and a copper salt, together with a buffer wh[ich] acts to maintain the solution within an acidic range which will permit substantial precipitati[on] of copper sulphide.

12. A process for the removal of hydrogen s[ul]phide from gaseous mixtures containing the sa[me] which comprises scrubbing such gaseous mixtu[re] with an aqueous solution of sodium dichroma[te] a copper salt and a buffer, which latter acts [to] maintain said solution within an acidic pH ran[ge] which will permit substantial precipitation [of] copper sulphide.

13. A process for the removal of hydrog[en] sulphide from gaseous mixtures containing t[he] same, which comprises scrubbing such gaseo[us] mixtures with an aqueous solution of sodi[um] dichromate, copper sulphate and a buffer, whi[ch] latter maintains an acidic pH range which w[ill] permit substantial precipitation of copper s[ul]phide and will prevent formation of substant[ial] amounts of monochromate.

14. A process for the removal of hydrog[en] sulphide from gaseous mixtures containing t[he] same, which comprises scrubbing such gaseo[us] mixtures with an aqueous solution of a [di]chromate containing a copper salt, and whi[ch]

said solution is maintained within the pH range of 1 to 7 by the action of a buffer.

15. A process for the removal of hydrogen sulphide from gaseous mixtures containing the same, which comprises scrubbing such gaseous mixtures with an aqueous solution of dichromate and a cadmium salt, and which said solution is maintained of such acidity as will insure retention of sulphide in the solution.

16. A process for the removal of hydrogen sulphide from gaseous mixtures containing the same, which comprises scrubbing such gaseous mixtures with an aqueous solution of a dichromate and a cadmium salt, and which said solution is maintained within the pH range of 2 to 7.

17. A process for the removal of hydrogen sulphide from gaseous mixtures containing the same, which comprises scrubbing such gaseous mixtures with an aqueous solution of a dichromate and a cadmium salt, together with a buffer which acts to maintain the solution within an acidic pH range which will permit substantial precipitation of cadmium sulphide.

18. A process for the removal of hydrogen sulphide from gaseous mixtures containing same, which comprises scrubbing such gas mixtures with an aqueous solution of so dichromate, a cadmium salt and a buffer, latter acts to maintain said solution withi acidic pH range which will permit substa precipitation of cadmium sulphide.

19. A process for the removal of hydr sulphide from gaseous mixtures containing same, which comprises scrubbing such ga: mixtures with an aqueous solution of so dichromate, cadmium sulphate and a b which latter maintains an acidic pH range w will permit substantial precipitation of cadr sulphide and will prevent formation of sub: tial amounts of monochromate.

20. A process for the removal of hydr sulphide from gaseous mixtures containing same, which comprises scrubbing such ga: mixtures with an aqueous solution of a chromate containing a cadmium salt, and w said solution is maintained within the pH r of 2 to 7 by the action of a buffer.

RONALD E. REITMEIE